United States Patent

[11] 3,586,381

| [72] | Inventor | Howard P. Siegel<br>Lansing, Mich. |
|---|---|---|
| [21] | Appl. No. | 853,853 |
| [22] | Filed | Aug. 28, 1969 |
| [45] | Patented | June 22, 1971 |
| [73] | Assignee | Motor Wheel Corporation<br>Lansing, Mich. |

[54] RIM CLAMP FOR ADJUSTABLE TREAD WHEEL
4 Claims, 8 Drawing Figs.

| [52] | U.S. Cl. | 301/9 |
|---|---|---|
| [51] | Int. Cl. | B60b 23/12 |
| [50] | Field of Search | 301/9 TV,<br>1, 18, 19 |

[56] References Cited
UNITED STATES PATENTS

| 2,702,724 | 2/1955 | Nordenson | 301/9 |
|---|---|---|---|
| 2,852,312 | 9/1958 | Temple | 301/9 |
| 2,963,317 | 12/1960 | Stough | 301/9 |

FOREIGN PATENTS

| 755,301 | 8/1956 | Great Britain | 301/9 |
|---|---|---|---|

*Primary Examiner*—Richard J. Johnson
*Attorney*—Barnes, Kisselle, Raisch and Choate

ABSTRACT: A rim clamp for an adjustable tread wheel body wherein the clamp has a body with double ramps for urging the body axially outward into firm engagement with a rail of the wheel rim and a clamping element cooperating with an integral lug on the body to axially clamp the body to the rim.

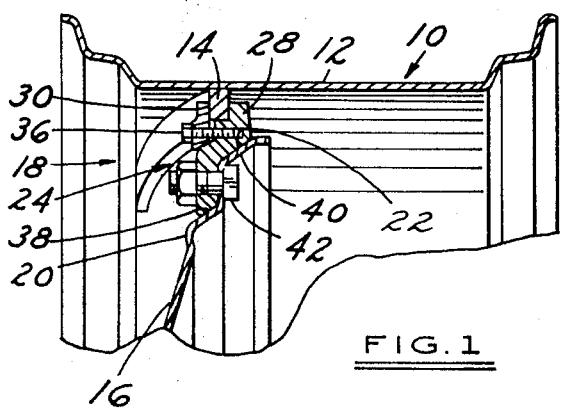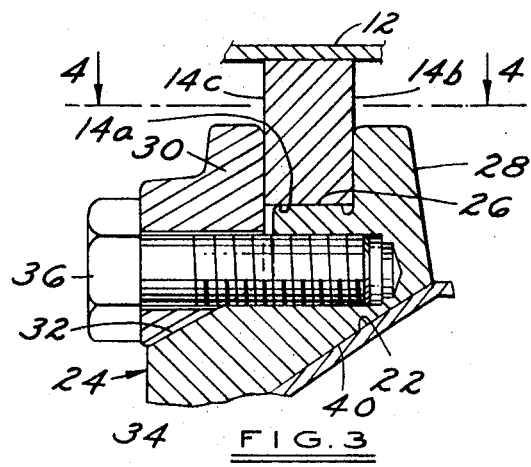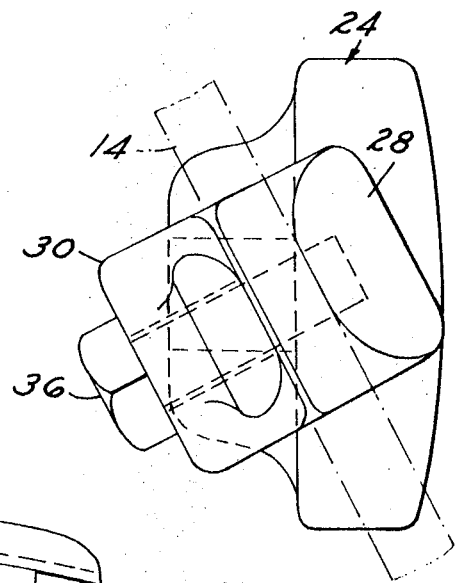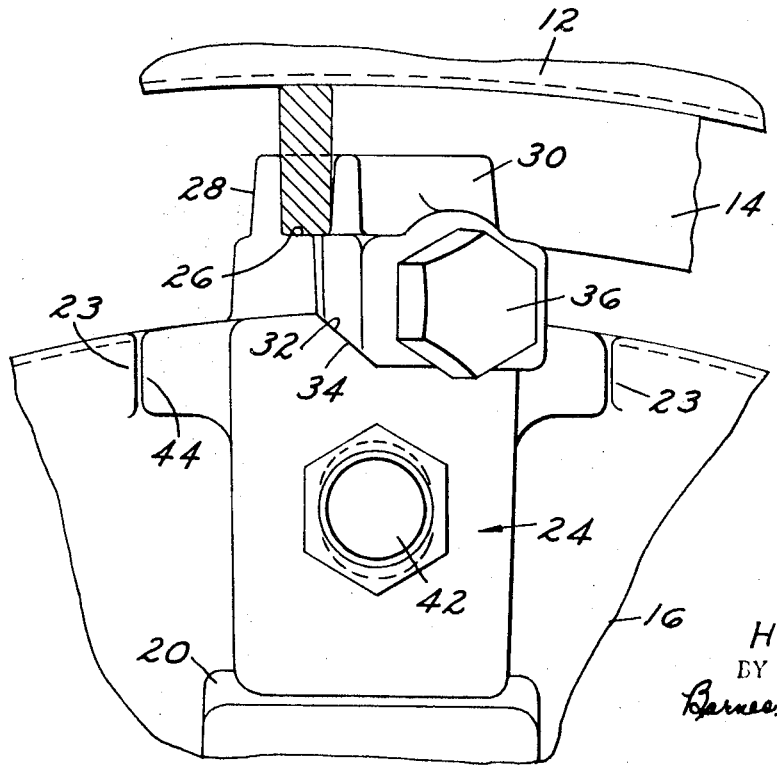

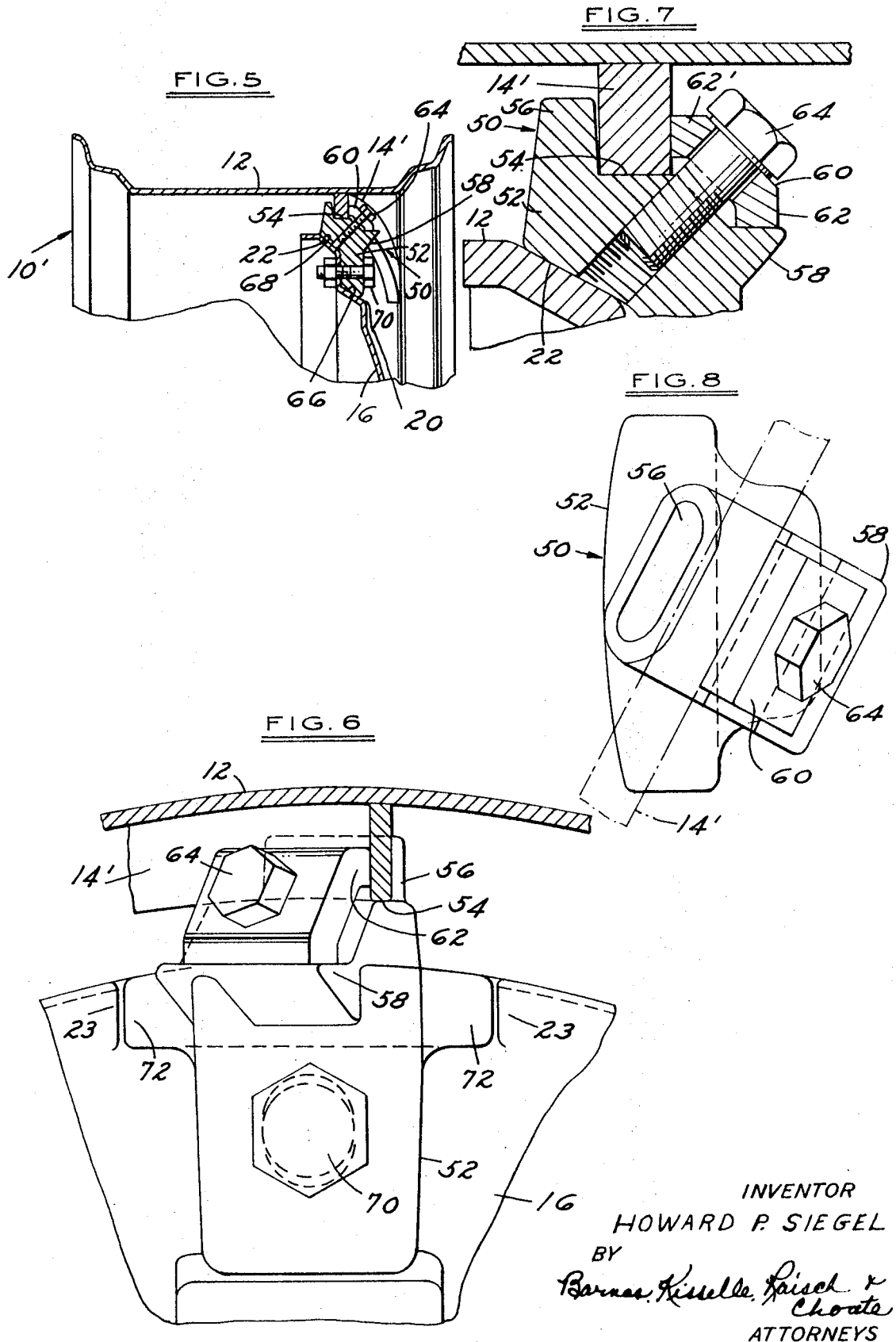

RIM CLAMP FOR ADJUSTABLE TREAD WHEEL

This invention relates to an adjustable tread wheel commonly used on tractors and more particularly to a clamp device for securing the wheel rim to the wheel body.

Wheels designed so that the rim can be adjusted axially with respect to the body are not broadly new and one such adjustable wheel is disclosed in the C. R. Stough U.S. Pat. No. 2,963,317 dated Dec. 6, 1960. One of the problems with the prior adjustable wheel structures is that when they are used on farm tractors and other vehicles which develop considerable torque, the clamps which secure the wheel body to the rim do not prevent the body from slipping or rotating with respect to the rim.

An object of this invention is to provide a clamping device which decreases the tendency of a body of an adjustable wheel to slip with respect to the rim of the wheel.

Another object of this invention is to provide a wheel clamp which can be economically manufactured, easily assembled and readily adjusted.

In the drawings:

FIG. 1 is a fragmentary vertical sectional view of an adjustable tread wheel utilizing a first form of the clamping device of this invention.

FIG. 2 is a fragmentary side elevational view partially in section of the wheel and clamping device of FIG. 1.

FIG. 3 is a fragmentary enlarged sectional view of a portion of the wheel and clamping device of FIG. 1.

FIG. 4 is a plan view of the first form of the clamping device of this invention with the rail of the wheel illustrated in phantom.

FIG. 5 is a fragmentary vertical sectional view of an adjustable tread wheel utilizing a second form of the clamping device of this invention.

FIG. 6 is a fragmentary side elevational view partially in section of the wheel and clamping device of FIG. 5.

FIG. 7 is a fragmentary enlarged sectional view of a portion of the wheel and clamping device of FIG. 5.

FIG. 8 is a plan view of the second form of the clamping device of this invention with the rail of the wheel illustrated in phantom.

As illustrated in FIG. 1 an adjustable tread wheel 10 has an outer tire-receiving rim 12 with a plurality of circumferentially extending helical rails 14 which extend across approximately the entire width of, and are secured to, the inner peripheral surface of the rim. A central disc 16 is secured to the rim by a clamp 18 constructed in accordance with this invention. Central disc 16 has a pair of radially and axially spaced ramp faces 20 and 22 and pairs of abutments 23 (FIG. 2) which form a plurality of circumferentially spaced pockets in disc 16, one such pocket being provided for each clamp 18. The remaining structure of the adjustable tread wheel is explained in greater detail in the aforementioned U.S. Pat. No. 2,963,317 which is incorporated herein by reference.

Clamp 18 includes a body 24 with an abutment 26 having a convexly curved outer surface for matching engagement with the bottom or inner peripheral surface 14a of rail 14, and a radially extending integral lug 28 for engagement with a side surface 14b of rail 14. A movable clamping element or lug 30 is engageable with the other side 14c of rail 14 and has a cam surface 32 on its base which cooperates with a ramp or bearing surface 34 on body 24. A bolt 36 threadingly engages body 24 and urges lug 30 axially toward lug 28. Axial movement of lug 30 toward lug 28 causes ramp 34 to cam lug 30 radially outward and into firm engagement with bolt 36, which in turn tends to lock the bolt in place so that it will not jiggle or work loose when the wheel is in use. Clamp body 24 also has a pair of parallel cam surfaces 38 and 40 (FIG. 1) which cooperate with ramps 20 and 22 and wheel disc 16 to urge abutment 26 into firm engagement with the bottom surface 14a of rail 14. Body 24 is secured in one of the pockets of wheel disc 16 by a nut and bolt assembly 42. Side portions or wings 44 of body 24 cooperate with abutments 23 to limit the movement of the body with respect to the wheel disc.

FIGS. 5 through 8 illustrate a second form of the clamp designated generally as 50 attached to an adjustable tread wheel 10'. By way of illustration and not by way of limitation, wheel 10' is the other hand of wheel 10 and has a rim 12 with opposite-hand helical rails 14' and a disc 16 with a plurality of clamp pockets each having a pair of parallel inclined ramps 20 and 22 and abutments 24. Clamp 50 is also the opposite hand of clamp 18.

Clamp 50 has a main body 52 with an abutment 54 having a circumferential surface for engagement with the bottom of rail 14', an integral radially extending lug 56 for engagement with one side of rail 14' and an integral projection 58 providing a bearing surface for one end of a clamping element 60 which bears on the other side of rail 14'. Clamping element 60 is a plate with a central aperture and inturned ends 62 and 62' respectively urged into engagement with block 58 and rail 14' by a bolt 64 threadably engaging body 52. As bolt 64 is tightened, the camming or lever action of clamping element 60 causes end 62' to urge rail 14' into firm engagement with lug 56. Body 52 has a pair of radially and axially spaced parallel cam surfaces 66 and 68 which cooperate with ramps 20 and 22 on wheel disc 16 to support main body 52 and cam abutment 54 radially outward into firm engagement with the bottom of rail 14'. Body 52 is secured to wheel disc 16 by a nut and bolt assembly 70 and side portions or wings 72 of the body (FIG. 6) cooperate with abutments 23 to limit the movement of the body with respect to the wheel disc.

The dimensional relationship of the rim, disc and clamps of each wheel to each other is such that the clamps will be cammed radially outward and urged into firm engagement with the bottom of the rails when the clamps are secured to the disc. In using either form of the clamp it is loosely assembled to both disc 16 and rails 14 or 14' of rim 12. Disc 16 is rotated with respect to rim 12 to obtain the desired tread width and then bolt and nut assembly 42 of clamp 18 or 70 of clamp 50 is tightened to urge the clamp radially outward into firm engagement with the bottom of rail 14 or 14' and to secure the clamp body to disc 16. This both initially locks the rim in position with respect to disc 16 and also centers the disc within rim 12. Bolt 36 of clamp 18 or bolt 64 of clamp 50 is then tightened to urge clamping element 30 or 60 and the integral lug on the clamp body into firm engagement with the sides of rail 14 or 14' to provide an additional clamping force tending to secure the clamp to the rail. To change the tread width of a vehicle bolt 36 and bolt assembly 42 of clamp 18 or bolt 64 and bolt assembly 70 of clamp 50 are loosened, disc 16 is rotated with respect to rim 12, and the bolt assembly and clamping bolt of each clamp are retightened.

The clamp of this invention provides a simple structure having a minimum number of parts which can be economically manufactured and readily assembled and adjusted. The clamps provide both radial and axial clamping forces which increase the holding power of the clamp and tend to reduce slippage of the wheel disc with respect to the rim. In one form the clamping element also locks its clamping bolt to reduce the tendency of the clamp to jiggle or work loose during operation of the wheel.

I claim:

1. A clamp for use with an axially adjustable tread wheel structure having a rim with a plurality of circumferentially extending helical rails on the inner surface of the rim, each rail having a pair of radial sides and an axial inner peripheral bottom surface, and a wheel disc having a plurality of circumferentially spaced pairs of radially inclined parallel ramp faces with the ramp faces of each pair being spaced radially and axially from each other, said clamp comprising:

a. a main body having a pair of parallel cam surfaces thereon radially and axially spaced and inclined for engagement with the wheel disc ramp faces to urge the body radially outward, an abutment thereon having a surface engageable with a portion of the bottom surface of the helical rail, a radially extending lug thereon for engagement with a portion of one side of the helical rail, and a bearing surface thereon disposed on the other side of said abutment surface from said lug, b. a clamping element movable relative to said body axially of said rail and engageable with a portion of the other side of the rail and said bearing surface on said body, c. releasable securing means for urging said lug and said clamping element into locking engagement with said one and other sides of the helical rails, and d. adjustable means for urging said body and said cam faces thereon into firm engagement with a pair of the ramp faces of the wheel disc, whereby said abutment is urged into initial locking engagement with a portion of the bottom surface of the helical rail and said securing means urges said lug and clamp element into locking engagement with the sides of the helical rail such that the rim will be firmly secured for rotation with the disc of the wheel.

2. The clamp as defined in claim 1 in which said clamping element comprises a plate having inturned ends disposed such that one of said ends abuts on said bearing surface of said body when the other of said ends is urged by said releasable securing means into locking engagement with a portion of the side of the helical rail, whereby the helical rail is clamped axially between said lug on said body and said other end of said plate.

3. The clamp as defined in claim 1 in which said clamping element comprises a radially extending second lug separable from said body and having a bottom surface engageable with said bearing surface on said body, said second lug being positioned in opposed relationship to said first lug axially of the rail such that said securing means can urge said second lug toward said first lug on said body and both of said lugs into locking engagement with opposite side portions of the rail.

4. The clamp as defined in claim 3 in which said securing means comprises a bolt extending through a hole in said second lug and threadingly engaging said body, and in which said bearing surface on said body and said bottom surface on said second lug are inclined relative to the axis of the rail such that when said bolt urges said second lug toward said lug on said body said second lug is cammed radially outwardly into engagement with said bolt whereby said bolt is locked against rotation.